(12) United States Patent
Armbruster et al.

(10) Patent No.: US 9,900,179 B2
(45) Date of Patent: Feb. 20, 2018

(54) COMMUNICATION NETWORK AND METHOD FOR OPERATING A COMMUNICATION NETWORK

(71) Applicant: SIEMENS AKTIENGESELLSCHAFT, München (DE)

(72) Inventors: Michael Armbruster, München (DE); Ludger Fiege, Grafing (DE); Johannes Riedl, Ergolding (DE); Thomas Schmid, Leinfelden-Echterdingen (DE); Andreas Zirkler, München (DE)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 14/435,188

(22) PCT Filed: Sep. 10, 2013

(86) PCT No.: PCT/EP2013/068679
§ 371 (c)(1),
(2) Date: Apr. 13, 2015

(87) PCT Pub. No.: WO2014/063858
PCT Pub. Date: May 1, 2014

(65) Prior Publication Data
US 2015/0256356 A1    Sep. 10, 2015

(30) Foreign Application Priority Data
Oct. 22, 2012  (DE) .................. 10 2012 219 176

(51) Int. Cl.
*G01R 31/08* (2006.01)
*H04L 12/46* (2006.01)
(Continued)

(52) U.S. Cl.
CPC .......... *H04L 12/4641* (2013.01); *H04L 47/20* (2013.01); *H04L 47/726* (2013.01); *H04L 67/12* (2013.01)

(58) Field of Classification Search
USPC ........................................ 370/235
See application file for complete search history.

(56) References Cited

U.S. PATENT DOCUMENTS 8,355,348 B1 * 1/2013 Miller ................... H04L 12/462
370/256
2006/0212677 A1 * 9/2006 Fossum ................. G06F 1/3237
712/1
(Continued)

FOREIGN PATENT DOCUMENTS

CN    1018033616 A     8/2010
EP    1705839 A1 *     9/2006    ............. H04L 12/56
(Continued)

OTHER PUBLICATIONS

"Understanding Multiple Spanning Tree Protocol (802.1s)", Cisco, XP002426379, May 14, 2005, pp. 1-12.*
(Continued)

*Primary Examiner* — Phuongchau Ba Nguyen
(74) *Attorney, Agent, or Firm* — Schmeiser Olsen & Watts LLP

(57) ABSTRACT

A communications network with a plurality of network devices is provided. The communications network has a plurality N of virtual networks, which are implemented in the communications network in such a manner that each of the network devices is coupled to the communications network via at least two virtual networks. The communications network also has a plurality of network segments. A subset of the network devices is assigned to each of the network segments, wherein each network device arranged at a peripheral region of a network segment has N limiting
(Continued)

units, each of the N limiting units being assigned to a respective one of the N virtual networks and designed to limit a data reception of the respective virtual network to a threshold for the data transmission rate predetermined for the respective virtual network.

14 Claims, 3 Drawing Sheets

(51) Int. Cl.
*H04L 12/911* (2013.01)
*H04L 12/813* (2013.01)
*H04L 29/08* (2006.01)

(56) References Cited

U.S. PATENT DOCUMENTS

| | | | |
|---|---|---|---|
| 2007/0280106 A1* | 12/2007 | Lund | H04L 63/1408 370/230 |
| 2008/0159124 A1* | 7/2008 | Sasaki | H04L 12/2856 370/217 |
| 2009/0080334 A1* | 3/2009 | DeCusatis | H04L 47/10 370/237 |
| 2009/0109841 A1* | 4/2009 | Nozaki | H04L 45/00 370/218 |
| 2014/0328171 A1* | 11/2014 | Armbruster | H04L 49/55 370/230 |
| 2015/0256356 A1* | 9/2015 | Armbruster | H04L 12/4641 370/235 |

FOREIGN PATENT DOCUMENTS

| | | |
|---|---|---|
| JP | 2001211254 A | 8/2001 |
| JP | 2009232147 A | 10/2009 |

OTHER PUBLICATIONS

International Search Report; PCT/EP2013/068679; International File Date: Sep. 10, 2013; 2 pgs.

Cisco Systems et al: "Understanding Multiple Spanning Tree Protocol (802.1s)", May 14, 2005 (May 14, 2005); URL:http:jjweb.archive.orgjweb/20050514065955/www.cisco.com/warp/public/473/147.pdf.

* cited by examiner

COMMUNICATION NETWORK AND METHOD FOR OPERATING A COMMUNICATION NETWORK

CROSS-REFERENCE TO RELATED APPLICATIONS

This application claims priority to PCT Application No. PCT/EP2013/068679, having a filing date of Sep. 10, 2013, based on DE 102012219176.3 having a filing date of Oct. 22, 2012, the entire contents of which are hereby incorporated by reference.

FIELD OF TECHNOLOGY

The following relates to a communication network and a method for operating a communication network. The communication network may particularly be an Ethernet network.

BACKGROUND

Communication networks are being used to an ever greater extent for measuring, controlling and regulating complex technical systems. By way of example, networks are increasingly used in motor vehicles in order to form vehicle control systems. Corresponding complex and safety-relevant technical systems make great demands on the availability of the control elements provided as network devices. When single components fail, such as sensors or control devices, this must not result in the failure of the overall system. Particular relevance to safety applies to drive by wire systems, e.g. steer by wire systems, in which the steering wheel position is converted into wheel positions by electric motor using a network coupling comprising sensor, control and actuator devices.

In the past, redundant designs of particularly critical components have been used, so that in the event of an error the respective backup or redundant component can undertake the respective task. When there are a plurality of redundant components, it is necessary to ensure that only one of the two or more control devices has the respective control sovereignty. Furthermore, contradictory control demands must not arise for the same control functionalities. It is therefore desirable for all the control components to have the same information or data in the network.

In this respect, errors in the form of inconsistent data, which may be corrupt in the event of data transmission via the network that is used, for example, need to be recognized A standard network environment that is in widespread use is based on the Ethernet protocol. The use of Ethernet infrastructures has the advantage that standardized network devices and methods can be used. In the past, however, proprietary data buses were also used in order to link control components having internal redundancy, that is to say duplicate functionality, to one another.

Furthermore, it is possible for nodes used in the network to be erroneous. By way of example, error types that involve a network device using a high frequency to send data to the network that contains no data that the other control devices can use are known. The term "babbling idiot" is also used. The network infrastructure can then be burdened by high data rates such that it is no longer possible for genuine control or sensor data to be interchanged between the network devices that are still functioning. It is desirable to deal with particularly such erroneous behavior in safety-relevant networks and to process the available data in a suitable manner in order to ensure reliable operation of the unaffected devices in the network.

In the past, methods have been proposed in which the data interchange between prescribed communication partners has been subject to bandwidth limiting. However, faulty network nodes can also produce data packets with incorrect address data, this being unable to be handled satisfactorily for dedicated bandwidth limiting in every network topology, particularly in a ring-shaped network topology.

Furthermore, methods are known that are based on synchronized communication among the network nodes. In this case, particular time slots are defined for the data interchange between prescribed communication partners. Such time slot methods require sophisticated synchronization and special hardware devices.

SUMMARY

An aspect relates to an improved communication network.

Accordingly, a communication network having a multiplicity of network devices is proposed. The communication network has a plurality N of virtual networks that are implemented in the communication network such that each of the safety-critical network devices is coupled to the communication network via at least two virtual networks. In addition, the communication network has a plurality of network segments. In this case, each of the network segments has an associated subset of the network devices, wherein each network device arranged at a marginal region of a network segment has N limiting units, wherein the respective instance of the N limiting units is associated with a respective instance of the N virtual networks and is set up to limit data reception of data associated with the respective virtual network to a threshold value for the data transmission rate, which threshold value is predetermined for the respective virtual network.

In this case, the threshold values are predetermined for the respective virtual network, that is to say in particular are set specifically for the virtual network.

The monitoring of the data transmission rate and the possible limiting of data reception particularly allows what are known as "babbling idiots" to be handled, that is to say network devices in the network that, out of a fault, send meaningless data or data that cannot be interpreted by other devices in the network. Frequently, said "meaningless" data are sent by the erroneous devices at a high frequency, so that a burden on the network infrastructure and communication paths can arise. Limiting the affected reception ports or blocking data reception for excessive data rates nevertheless allows reliable data communication, even if there are babbling idiots present.

If, by way of example, packets need to be routed through a network segment because otherwise the network devices next to this network segment would be unreachable or unreachable via disjunct paths, the threshold values (bandwidth limit) that are routed through the relevant network segment can be limited in a specific manner, particularly in a VLAN-specific manner. This makes it possible to prevent a data packet that has been produced by a babbling idiot outside a network segment from being the cause of this actually intact network segment being isolated.

The virtual networks are implemented in the communication network via disjunct paths, in particular physical disjunct paths.

A data transmission rate is understood to mean the digital volume of data that is transmitted via a transmission channel or communication path within a unit of time. The terms data transfer rate, data rate, transmission speed, connection speed, bandwidth or capacity are also used. An established indication of a data transmission rate is bits per second.

The maximum data transmission rate is preferably determined on the basis of the provided bandwidth of the communication network. If the topology of the network and the functions to be performed reveal all data transfer rates provided for error-free operation between the network nodes and network devices or transmission and reception ports, the limiting units can be set up with corresponding sensitivity.

In addition, the error situation of a babbling idiot is handled by checking the data transfer rate and if need be limiting reception such that at least one communication path transmitting without error is available for data that are not disturbed or sent by a faulty device.

The use of virtual networks in the communication network also allows minimization of the threshold values of individual limiting units, particularly in the marginal region of the individual network segments. This minimizes the overall probability of failure of the communication network overall system.

Implementation of the concept of the limiting units particularly requires no kind of change to the hardware of the standard switch components. Either the features of high-quality switch hardware can be used or the switch hardware can be augmented by a relatively simple ballast. The available bandwidth is not or only slightly adversely affected, depending on the embodiment.

By way of example, the respective network segment can be outwardly partitioned by means of a relatively lower threshold value for the data transmission rate than in the central region or interior of the network segment. Consequently, limiting units in the marginal region have a lower threshold value for the data transmission rate than the limiting units in the central region of the network segment. The central region of the network segment can also be provided with no limiting units.

Overall, a particularly reliable network arrangement is obtained that functions reliably even in the event of disturbances in network nodes. The redundant communication as a result of the use of the at least two virtual networks allows consistent controller communication and low-sophistication error analysis and correction and low-sophistication handling of errors by babbling idiots.

The limiting units may be embodied particularly as part of the switch devices. Implementation as a program or program code for operating one of the switch devices is additionally conceivable.

In one embodiment, each of the N threshold values of the N limiting units of one of the network devices is lower than a maximum data transmission rate of the communication network. This ensures that the maximum data transmission rate of the communication network cannot be exceeded.

In a further embodiment, each network device comprises a control device and a switch device, coupled to the control device, that has a reception port and a transmission port for sending and receiving data via the communication network at no more than a maximum data transmission rate, wherein the N limiting units are associated with the reception port and are each set up to limit the data reception of data associated with the respective virtual network at the respective associated reception port to the threshold value for the data transmission rate that is specific to the respective virtual network.

The combination of a transmission and reception port can also be understood to mean a communication port of the respective device. The virtual networks are particularly in the form of virtual local area networks (VLANs).

In a further embodiment, exclusively the network devices arranged at a marginal region of a network segment are each equipped with the N limiting units. This minimizes the number of limiting units that are necessary. Hence, this embodiment is very inexpensive.

In a further embodiment, the network devices comprise at least two network devices that are redundant with regard to their functionality, wherein subsets or network segments are in a form such that each of the subsets has at most one of the redundant network devices associated with it. Network devices that are redundant with regard to their functionality are arranged in different network segments, so that in the event of failure of one network segment there is at least still one redundant network device in place in another network segment and hence the overall functionality of the overall system is not endangered.

In a further embodiment, the subsets are disjunct subsets.

In a further embodiment, the virtual networks are implemented in the communication network so as to prevent overshooting of the threshold value for the data transmission rate at a limiting unit of a network segment on account of reception of data from another network segment.

In this case, the effect achieved by taking account of the different virtual networks, for example different VLANs, is that a segment cannot be isolated on account of packets that have been fed in outside the segment. This is achieved by virtue of the VLANs being purposely configured such that packets are not routed through a segment, particularly an outer ring.

As an alternative to VLANs, other suitable virtualization technologies can be used.

In a further embodiment, the virtual networks are implemented in the communication network such that each of the network devices is coupled to the communication network via at least two virtual networks and none of the virtual networks has a ring topology. The avoidance of ring topologies ensures that no circulating packets can arise in the network.

In a further embodiment, the virtual networks are implemented in the communication network such that a maximum link transmission rate is set for each communication path between a transmission port and a reception port, wherein the sum of the N threshold values of the N limiting units is less than or equal to the maximum link transmission rate of the associated reception port. By way of example, it is possible to gauge during design of the communication network what link transmission rates may be present. The limiting units can then be sensitized accordingly, so that the data reception is limited when the maximum link transmission rate is exceeded.

In a further embodiment, the data are associated with at least two priority classes, wherein the N limiting units are set up to limit exclusively the data reception of a higher priority class. By way of example, a first priority class can relate to particularly safety-relevant data and a second priority class can relate to less critical data. During the design of the communication network, the maximum data transfer rates are then stipulated and the limiting units are set accordingly. The various priority classes are recorded at the limiting units and the data are filtered or limited on the basis thereof.

The communication network may comprise an Ethernet infrastructure. The switch device can also be referred to as a bridge or router device. For network devices, the terms network nodes, nodes, network components or network elements are also used.

Suitable control devices that are provided in the network devices are a CPU, a microprocessor or else other programmable circuits, for example. A control device can additionally be understood to mean a sensor or actuator device.

The communication network or network protocol preferably provides for point-to-point connections from one node or one network device to another. In this case, bidirectional or duplex communication may be possible.

In a further embodiment, the network devices are each embodied as an individual FPGA, ASIC, IC chip or hardwired microcircuit.

In a further embodiment, the communication network comprises the multiplicity of the network devices and a number of coupling switch devices, wherein the coupling switch devices are each coupled to the communication network exclusively via a single virtual network.

Preferably, at least two limiting units of different network devices are allocated various or different threshold values for the data transmission rate. The sum of these threshold values is less than or equal to the prescribed maximum data transmission rate in the communication network. The threshold values for the data transmission rate can also be referred to as a bandwidth limit.

The use of different threshold values particularly makes it possible for different segments or network segments to be formed in the communication network. In this case, the network segments are formed such that they can fail as a whole segment without putting the overall system into a dangerous state, e.g. network segments with a shared power supply. An overall system that is supplied with power by a plurality of power supplies must anyway be designed such that it can cope with the failure of one power supply.

In this case, in particular, possible delaying of a block, when a network device is babbling just below the bandwidth limit, by segments that are delimited by means of limiting units with lower bandwidth limit values is purposefully limited to one segment.

By way of example, the respective threshold value can be indicated by a percentage based on the maximum physical data transmission rate of the network arrangement. It is thus possible to set various threshold values at 20%, 15%, 10%, 5% and 0% of the maximum physical data transmission rate, for example. In this case, a threshold value of 0% corresponds to a block. By way of example, the threshold values can be determined on the basis of the scheduled data transmission rates provided via the respective link, possibly with the addition of a safety supplement.

The communication network can also be referred to as a network arrangement and is particularly part of a vehicle.

The network devices may be sensor devices or actuator devices. Conceivable sensor devices are rotation speed sensors, braking control devices or switching control devices. It is also possible to use control devices that allow drive by wire, for example. This involves steering or acceleration pulses, for example, being transferred to appropriate actuators electronically via the network, so that the desired reaction from the vehicle begins.

Furthermore, a method for operating a communication network having a multiplicity of network devices is proposed:

In a first step, a plurality N of virtual networks is implemented in the communication network such that each of the network devices is coupled to the communication network via at least two virtual networks. In a second step, the network devices are arranged in a plurality of network segments, wherein each of the network segments is allocated a subset of the network devices, wherein each network device arranged at a marginal region of a network segment is equipped with N limiting units, wherein the respective instance of the N limiting units is allocated to a respective instance of the N virtual networks and is set up to limit data reception of data associated with the respective virtual network to a threshold value for the data transmission rate, which threshold value is predetermined for the respective virtual network.

In addition, a computer program product is proposed that prompts the performance of the method for operating a network arrangement, as explained above, on one or more program-controlled devices.

A computer program product such as a computer program means can be provided or delivered by a server in a network, for example as a storage medium, such as a memory card, a USB stick, a CD-ROM, a DVD, or else in the form of a downloadable file. This can be effected in a wireless communication network, for example, by transmitting an appropriate file with the computer program product or the computer program means. A suitable program-controlled device is a network device as described previously, in particular.

Furthermore, a data storage medium having a stored computer program with commands is proposed that prompts the performance of the method as explained above on a program-controlled device.

Further possible implementations of embodiments of the invention also comprise combinations—which are not explicitly cited—of method steps, features or embodiments of the method, of the network arrangement, of the network device or of a network node that are described above or below for the exemplary embodiments. In this case, a person skilled in the art will also add or modify individual aspects as improvements or additions to the respective basic form of embodiments of the invention.

BRIEF DESCRIPTION

Some of the embodiments will be described in detail, with reference to the following figures, wherein like designations denote like members, wherein.

DETAILED DESCRIPTION

Figure 1:
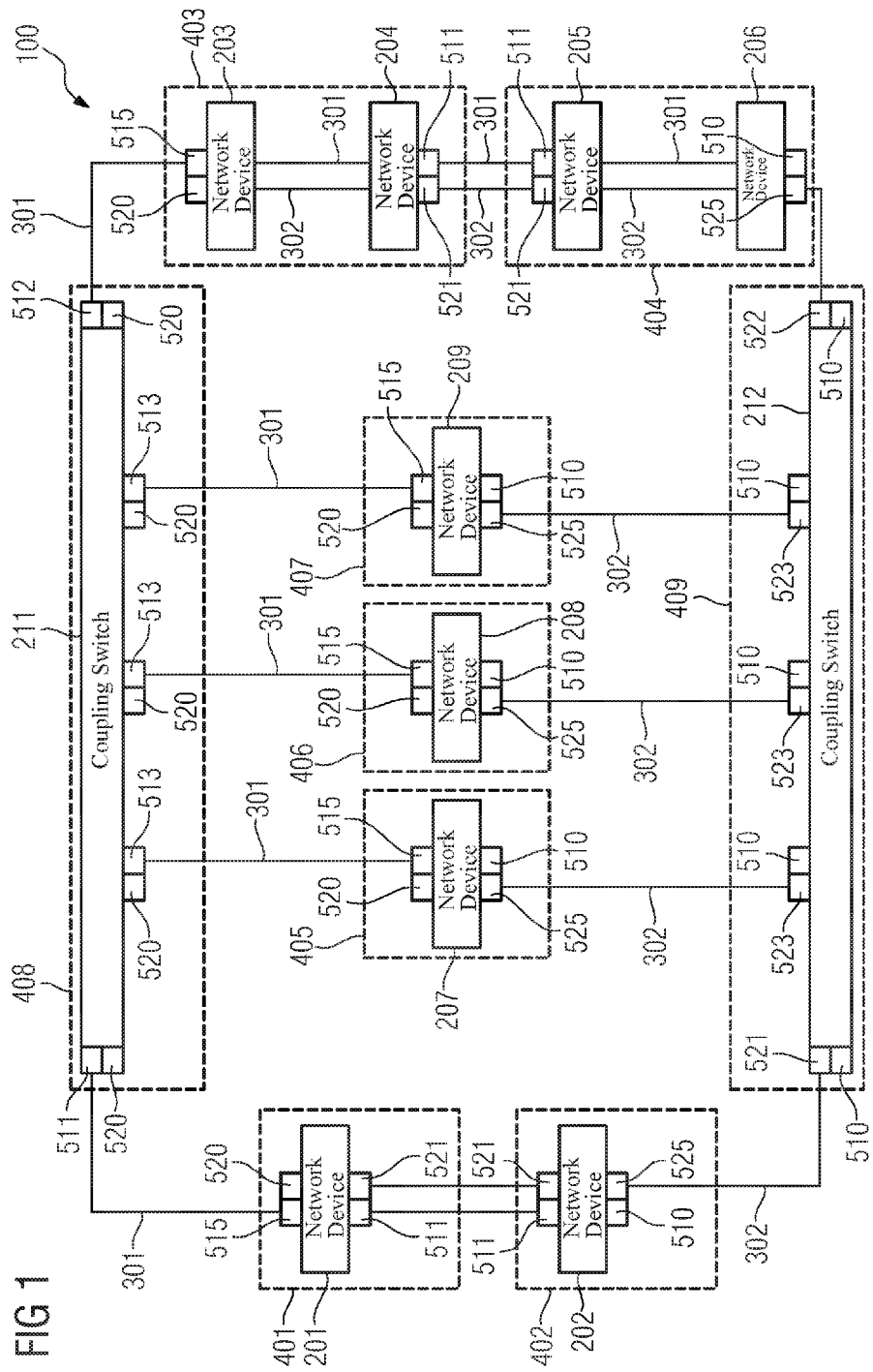
FIG. 1 shows a schematic illustration of a first embodiment of a communication network.

FIG. 1 shows a schematic illustration of a first embodiment of a communication network 100. By way of example, the communication network 100 can be used as an Ethernet network in a vehicle.

The communication network 100 of FIG. 1 comprises nine network devices 201-209 and also two coupling switch devices or coupling switches 211, 212. The network devices 201-209 can subsequently also be referred to as network nodes, nodes or control components, and each have a control device (in this regard see FIG. 3). The control devices are customized to accomplish particular tasks or functions. This may be sensor capture or an actuator, for example. They can also be implemented as CPUs or microprocessors. By way of example, it is conceivable for a control device to be set up to sense a pedal level or steering movement in the vehicle. It is conceivable, by way of example, for a control device to send a control signal or control data to a further control device in the network 100. In this case, particularly in the case of safety-relevant applications in motor vehicles, for example in the case of drive by wire, it is necessary to ensure that the control data are available in consistent form at all network nodes.

By way of example, the network devices 201-206 may be in the form of sensors or actuators. The network devices 207-209 form three control computers.

In addition, two virtual networks 301, 302 are formed in the communication network 100 of FIG. 1. In this case, the reference symbol 301 characterizes such virtual lines as can be associated with a first virtual network 301. Accordingly, the reference symbol 302 characterizes such virtual lines as can be associated with the second virtual network 302. The coupling switches 211, 212 are each coupled just to a single virtual network 301 or 302. Thus, the coupling switch 211 is coupled to the first virtual network 301, whereas the coupling switch 212 is coupled to the second virtual network 302. By contrast, the network devices 201-209 are coupled to the communication network 100 by means of both virtual networks 301, 302.

Furthermore, the communication network 100 of FIG. 1 contains nine network segments 401-409. In this case, each of the network segments 401-409 has an associated subset of the network devices 201-210. The subsets are disjunct subsets. Network devices 201-210 arranged at the marginal region of the network segment 401-409 have N limiting units 510-523. N corresponds to the number of virtual networks 301, 302 in the communication network 100 of FIG. 1 (N=2). In this case, the respective instance of the two limiting units of a network device is associated with a respective instance of the two virtual networks 301, 302 and set up to limit data reception of data associated with the respective network 301, 302 to a threshold value for the data transmission rate, which threshold value is predetermined for the respective virtual network 301, 302.

For the limiting units used in FIG. 1, the following syntax applies for the reference symbols: the hundreds position 5 characterizes the unit as a limiting unit. The tens position shows the association with the virtual network 301 or 302. The ones position indicates the threshold value of the limiting unit. Therefore, the following limiting units are used in FIG. 1:

510: Limiting unit (hundreds position: 5) of the first virtual network (tens position: 1) with a threshold value of 0% (threshold value: 0),
511: Limiting unit of the first virtual network with a threshold value of 5%,
512: Limiting unit of the first virtual network with a threshold value of 10%,
513: Limiting unit of the first virtual network with a threshold value of 15%, and
514: Limiting unit of the first virtual network with a threshold value of 20%.
515: Limiting unit of the first virtual network with a threshold value of 30%.
520: Limiting unit of the second virtual network with a threshold value of 0%,
521: Limiting unit of the second virtual network with a threshold value of 5%,
522: Limiting unit of the second virtual network with a threshold value of 10%,
523: Limiting unit of the second virtual network with a threshold value of 15%, and
524: Limiting unit of the second virtual network with a threshold value of 20%.
525: Limiting unit of the second virtual network with a threshold value of 30%.

Overall, FIG. 1 shows a parallel redundant communication network 100 with three control computers 207-209, to which are connected two outer rings with nodes 201, 202 and 203-206.

The scheduled traffic between the individual network segments 401-409 may be organized as follows, for example: 5% between the network devices 201, 202 and the coupling switches 211, 212, 10% between the network segments 403, 404 and the coupling switches 211, 212 and 15% in each case between the network segments 405-407 and the coupling switches 211, 212.

The two virtual network 301, 302 shown are subject to bandwidth limiting, for example 30%, at all nodes 201-212. Such nodes as are not connected to a virtual line 301, 302 of a particular virtual network also do not forward packets from this virtual network. By way of example, all nodes in FIG. 1 are existent in redundant form, the nodes 203 and 206 thus being able to be redundant in respect of one another, for example. The node 204 is redundant in respect of the node 201, and the node 205 is redundant in respect of the node 202. In addition, the coupling switches 211 and 212 may be redundant in respect of one another. The control computers 207-209 are also redundant in respect of one another. If one of the nodes 201-212 fails or is isolated from the communication, for example, the overall system remains operational. By way of example, redundant can denote the supply of power by different circuits in this case. If a power supply were to fail, one of each pair of redundant nodes, that is to say of the same type, would continue to be supplied with power and connected to the communication network 100. The network segments 401-409 are accordingly chosen such that at least one of each pair of redundant nodes 201-212 continues to be connected to the communication network 100 when a network segment 401-409 is isolated. That is to say that if two redundant nodes, for example the nodes 203 and 206, are installed in an outer ring, the bandwidth between them is limited with the computed threshold values or bandwidth limit values in both directions. Otherwise, it is also possible for band limiting units 510-523 to be provided only in selected positions.

On the basis of the ring-shaped topology of the communication network 100, the virtual connections 301, 302 form two disjunct, loop-free paths between all control computers 207-209 themselves and between the control computers 207-209 and the nodes 201-206.

The operation of the communication network 100 in the embodiment of FIG. 1 is illustrated with reference to the three examples below:

In the first example, it is assumed that the node 206 is the babbling idiot: the node 206 receives data from the nodes 203, 204 and 205 via the second virtual network 302. It adds an arbitrary amount of data to this virtual network 302, as a result of which the scheduled bandwidth of 10%, for example, is exceeded. The bandwidth limiting of the band limiting unit 522 of the coupling switch 212 rejects randomly selected packets. In the worst case, all valid packets from the nodes 203, 204 and 205 are rejected. However, this means that the scheduled bandwidth that is transmitted via this path 302 to the coupling switch 212 is not exceeded, as a result of which the data received from the nodes 202 and 201 are not adversely affected. Should the node 206 also send data from the first virtual network (VLAN) 301 to the bottom coupling switch 212, said data are not forwarded by the coupling switch 212 and have no effect.

In the other direction, the node 206 likewise sends an arbitrary amount of data, in the worst case on the two virtual networks 301 and 302. As a result, the bandwidth on both virtual networks 301, 302 is exceeded, and the limiting between the nodes 205 and 204 again rejects arbitrary packets. As a result, all packets that have been sent to the nodes 203, 204 and 205 via the bottom coupling switch 212 may be lost. At the same time, however, the limiting at this position ensures that the packets from the nodes 203 and 204 have sufficient bandwidth available to communicate with the control computers 207, 208 and 209 via the top coupling switch 211 of the first virtual network 301, since a limiting unit 512 with a higher threshold value is provided at this point. Hence, the network segment 404 with the nodes 205 and 206 is isolated from the communication in the communication network 100, but all other nodes can still communicate with one another.

In the second example below, it is assumed that the first control computer 207 is the babbling idiot:

In the worst case, the control computer 207 could babble in both directions on both virtual networks 301, 302 with the maximum bandwidth. The babbled bandwidth would then be limited to 15% at both coupling switches 211, 212. This would involve the use of the band limiting units 513 and 523. These 15% of bandwidth would advance to the two outer rings and to the other control computers 208, 209. Between the nodes 201 and 202 and between the nodes 204 and 205, they would encounter band limiting units 511, 521. Hence, on account of the packets babbled into the first VLAN 301, the nodes 202, 205 would no longer be able to be reached via the first VLAN 301. At the same time, in more or less mirror-inverted fashion, packets babbled via the bottom VLAN 302 would encounter band limiting by the band limiting units 511, 512 between the nodes 201 and 202 and between the nodes 204 and 205. This means that the nodes 203, 204 and 201 would no longer be able to reached via the bottom VLAN 302. Hence, if babbling in all possible directions via all possible virtual networks 301, 302, the babbling idiot in the control computer 207 disturbs the redundancy of all communication links, but all nodes remain connected to one another in nonredundant fashion in the communication network 100.

In the third example below, it is assumed that the top coupling switch 211 is the babbling idiot. The top coupling switch 211 can only flood over the first VLAN 301 with the maximum permissible bandwidth. It has no way of sending packets to the second VLAN 302, however, since none of its neighboring nodes accepts packets from the second VLAN 302 from it. Accordingly, a nonredundant connection continues to exist between all other nodes via the second VLAN 302.

Figure 2:
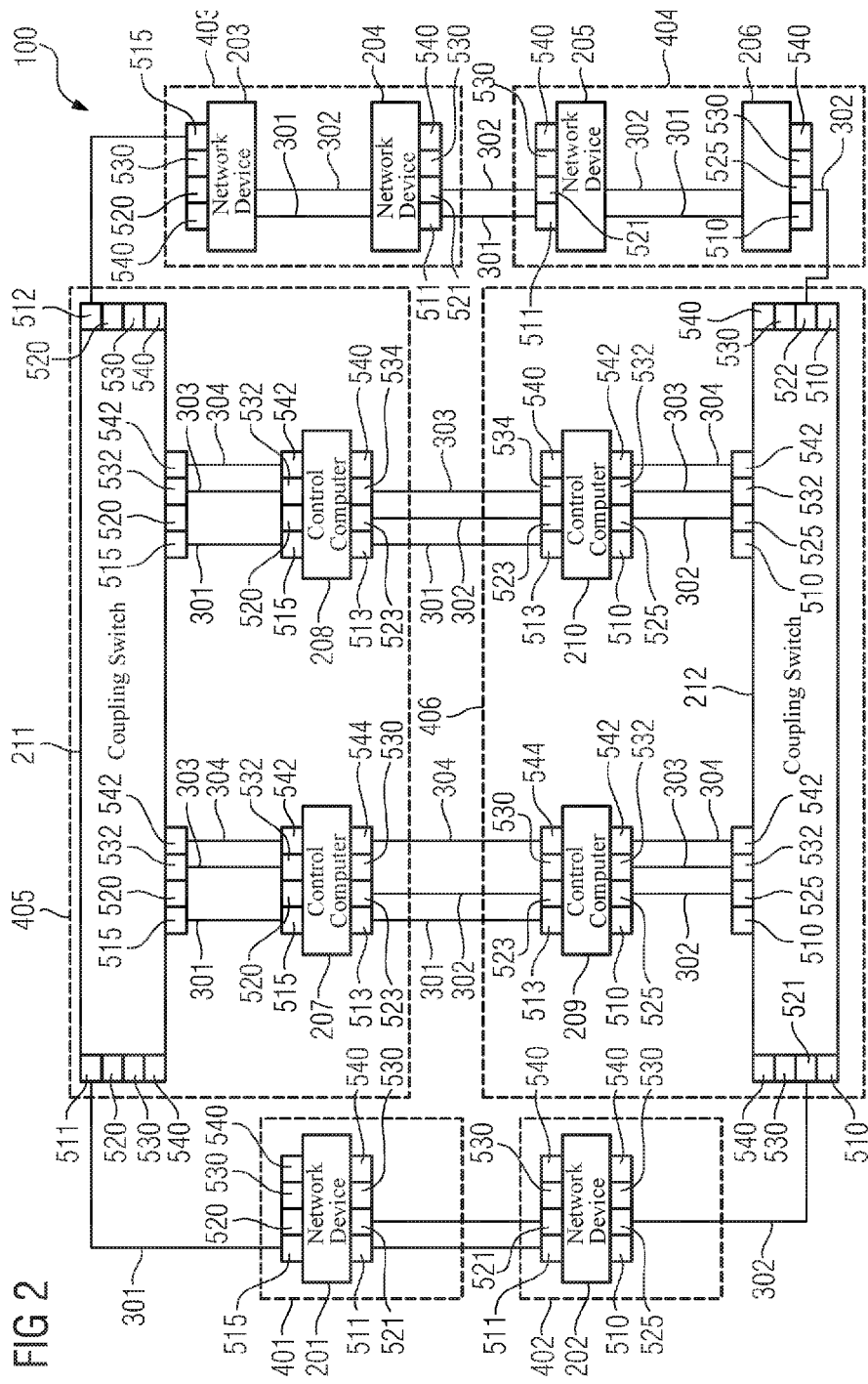
FIG. 2 shows a schematic illustration of a second embodiment of a communication network.

FIG. 2 shows a schematic illustration of a second embodiment of a communication network 100. The communication network 100 of FIG. 2 has the network devices 201-206, which are in the form of sensors or actuators, for example. In addition, the communication network 100 of FIG. 2 has four control computers 207-210 and two coupling switches 211, 212.

Hence, the communication network 100 of FIG. 2 is in the form of a triple ring-shaped network. An inner ring is formed by the four control computers 207-210, whereas two outer rings are provided by means of the nodes 201-206. As in the exemplary embodiment in FIG. 1, the nodes 201-206 can depict three pairs of redundant nodes. In addition, in the exemplary embodiment of FIG. 2, four virtual networks 301-304 are implemented, virtual lines of which are each denoted by means of their characteristic reference symbols 301-304. Virtual lines of the first virtual network 301 are provided with the reference symbol 301, for example.

The scheduled traffic in the communication network 1 between the individual network devices is as follows, for example (in this case, the scheduled traffic for the four virtual networks 301-304 is concatenated with regard to a percentage of the bandwidth):

Between nodes 201 and coupling switch 211: 5%, 0%, 0%, 0%,
Between nodes 201 and 202: 5%, 5%, 0%, 0%,
Between nodes 202 and coupling switch 212: 0%, 5%, 0%, 0%,
Between nodes 206 and coupling switch 212: 0%, 10%, 0%, 0%,
Between nodes 204 and 205: 5%, 5%, 0%, 0%,
Between nodes 203 and coupling switch 211: 10%, 0%, 0%, 0%,
Between control computer 207 and coupling switch 211: 15%, 0%, 10%, 10%,
Between control computer 208 and coupling switch 211: 15%, 0%, 10%, 10%,
Between control computer 207 and control computer 209: 15%, 15%, 0%, 10%,
Between control computer 208 and control computer 210: 15%, 15%, 10%, 0%,
Between control computer 209 and coupling switch 212: 0%, 15%, 10%, 10%,
Between control computer 210 and coupling switch 212: 0%, 15%, 10%, 10%

In FIG. 2 also, the network segments 401-406 are chosen such that when a network segment 401-406 is isolated at least one of each pair of redundant nodes 203, 206; 204, 201; 205, 202 remains connected to the communication network 100. The operation of the communication network 100 of FIG. 2 is illustrated on the basis of the three examples below.

In the first example below, it is assumed that the node 206 is the babbling idiot:

The node 206 receives data from the nodes 203, 204 and 205 via the second VLAN 302. The node 206 adds an arbitrary amount of data to this virtual network 302, as a result of which the scheduled bandwidth of 10%, for example, is exceeded. The band limiting unit 522 of the bottom coupling switch 212 rejects randomly selected packets. In the worst case, all valid packets from the nodes 203, 204, 205 are rejected. As a result, the scheduled bandwidth that is transmitted to the lower coupling switch 212 via this path is not exceeded, however, as a result of which the data received from the nodes 201 and 202 are not adversely affected.

Should the node 206 also transmit data to the bottom coupling switch 212 on a VLAN other than the second VLAN 302, said data are not forwarded by the coupling switch 212 and have no effect. In the other direction (upward in FIG. 2), the node 206 likewise sends an arbitrary amount of data, in the worst case on the first VLAN 301 and the second VLAN 302. In this case, the bandwidth on both VLANs 301, 302 is exceeded, and in this case the limiting between the nodes 205 and 204 rejects arbitrary packets. As a result, all packets that have been sent to the nodes 203, 204, 205 via the bottom coupling switch 212 may be lost. At the same time, however, the limiting at this position ensures that the packets from the node 203 and the node 204 have sufficient bandwidth available to communicate with the control computers 207-210 via the top coupling switch 211, since a limiting unit 512 with a higher threshold value is provided at this point. Hence, the network segment 404 with the nodes 205 and 206 is isolated from the communication, but all other nodes can still communicate with one another.

In the second example below it is assumed that the control computer 207 is the babbling idiot.

In the worst case, the control computer 207 could babble in both directions on all VLANs 301-304 with the maximum bandwidth. As a result, the VLAN 303 and 304 would be completely flooded and could no longer provide secured information for transmission. Only the connection between the control computers 208 and 210 could still be used via the third VLAN 303, since in this case a higher bandwidth of 20% is permissible. In the direction of the top coupling switch 211, it could send packets from the first VLANs 301 with 30% bandwidth. These packets would enter the outer rings of the network segments 401, 402; 403, 404 and encounter bandwidth limiting between the control computers 209 and 210 between the nodes 201 and 202 and between the nodes 204 and 205. Hence, the nodes 202, 205 and 206 and the control computer 210 would no longer be able to be reached via the first VLAN 301. At the same time, packets could be sent on the second VLAN 302 in the direction of the control computer 209, and the bandwidth is limited to 15% in this case. More or less in mirror-inverted fashion, these packets would encounter bandwidth limiting between the nodes 201 and 202 and between the nodes 204 and 205. Hence, the nodes 203, 204 and 201 and the control computer 208 would no longer be able to be reached via the VLAN 301. Hence, if babbling in all possible directions via all possible VLANs 301-304, the babbling idiot 207 in the control computer ring disturbs the redundancy of all communication links, but all nodes 201-210 continue to be connected to one another in nonredundant fashion.

In the third example below, it is assumed that the top coupling switch 211 is the babbling idiot:

The top coupling switch 211 can flood the first, third and fourth VLANs 301, 303, 304 with the maximum permissible bandwidth. However, it has no way of sending packets via the second VLAN 302, since none of its neighboring nodes accepts packets from the second VLAN 302 from it. Accordingly, at least one nonredundant connection continues to exist between all other nodes via the second VLAN 302.

In a further embodiment, the embodiment of FIG. 2 that is described above could also be used in a network of arbitrary network topology if the traffic patterns in this network are known a priori.

The present use of virtual networks and of the network segments and of the VLAN-based band limiting used therein allows babbling idiots to be tolerated in an Ethernet-based environment without losing connectivity, in the event of an arbitrary single error, to so many nodes, particularly to redundant nodes, that secure operation of the overall system would no longer be possible. In this context, it is possible to dispense with special hardware, and there is not even a requirement for special software in the CPU of the respective switch. Rather, a static configuration is sufficient, since the band limiting units define only thresholds for the data transmission rate, but ports and the association thereof are not changed.

Figure 3:
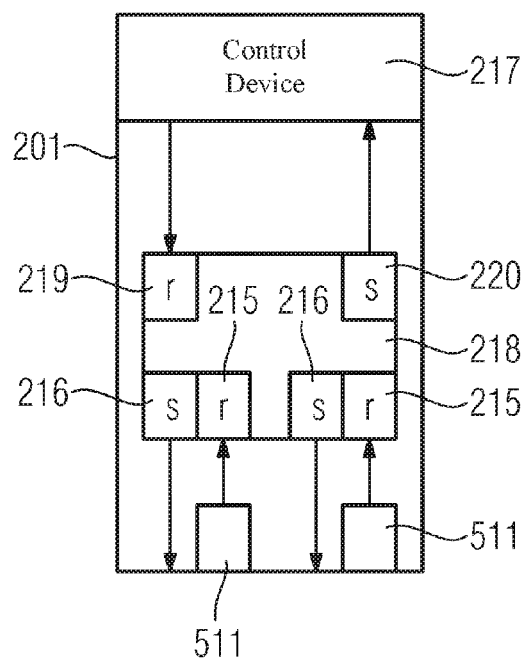
FIG. 3 shows an embodiment of a network device.

FIG. 3 shows an embodiment of a simple network device 201 that has a control device 217 and a switch device 218. The switch device 218 has two reception ports 215 and two transmission ports 216 coupled to the communication network 100 for the purpose of outputting and inputting data. In addition, the control device or CPU 217 is communicatively connected to the switch device 218 via transmission and reception ports 220, 219. The reception ports 215 have a respective associated limiting unit 511 that limits a data transfer when a stipulated maximum reception data rate is exceeded.

Figure 4:
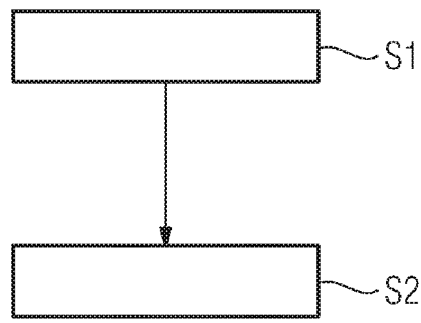
FIG. 4 shows a schematic flowchart for an exemplary embodiment of a method for operating a communication network.

FIG. 4 shows a schematic flowchart for an exemplary embodiment of a method for operating a communication network 100 that has a multiplicity of network devices 201-210, a plurality N of virtual networks 301-304 and a plurality of network segments 401-409. Examples of such communication networks 100 are shown in FIGS. 1 and 2.

The method of FIG. 4 has the following steps S1 and S2:

In step S1, the plurality N of virtual networks 301-304 is implemented in the communication network 100 such that each of network devices 201-210 is coupled to the communication network 100 via at least two virtual networks 301-304.

In step S2, the network devices 201-210 are arranged in the plurality of network segments 401-409 such that each of the network segments 401-409 is allocated a subset of the network devices 201-210. In this case, each network device 201-210 arranged at a marginal region of a network segment 401-409 is equipped with N limiting units, wherein the respective instance of the N limiting units is allocated to a respective instance of the N virtual networks 301-304 and is set up to limit data reception of data associated with the respective virtual network 301-304 to a threshold value for the data transmission rate, which threshold value is prescribed for the respective network 301-304.

Although the invention has been illustrated and described in more detail by the preferred exemplary embodiment, the invention is not restricted by the disclosed examples, and other variations can be derived therefrom by a person skilled in the art without departing from the scope of protection of the invention. In particular, embodiments of the network arrangement can have further networkable elements that may also be a babbling idiot.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A communication network having a multiplicity of network devices, comprising:
    a plurality N of virtual networks that are implemented in the communication network such that each of the multiplicity of network devices is coupled to the communication network via at least two virtual networks; and
    a plurality of network segments, wherein each of the plurality of network segments has an associated subset of the multiplicity of network devices, wherein each network device arranged at a marginal region of a network segment has N limiting units, wherein a respective instance of the N limiting units is associated with a respective instance of the plurality of N virtual networks and is set up to limit data reception of data associated with the respective virtual network to a threshold value for the data transmission rate, which threshold value is predetermined for the respective virtual network;
    wherein the virtual networks are implemented in the communication network so as to prevent overshooting of the threshold value for the data transmission rate at a limiting unit of a network segment on account of reception of data from another network segment.

2. The communication network as claimed in claim 1, wherein each of the N threshold values of the N limiting units of one of the multiplicity of network devices is lower than a maximum data transmission rate of the communication network.

3. The communication network as claimed in claim 1 wherein at least one network device comprises a control device and a switch device, coupled to the control device, that has at least one reception port and one transmission port for sending and receiving data via the communication network at a maximum data transmission rate, wherein the N limiting units are associated with the reception ports and are each set up to limit the data reception of data associated with the respective virtual network at the respective associated reception port to the threshold value for the data transmission rate that is specific to the respective virtual network.

4. The communication network as claimed in claim 1, wherein exclusively the multiplicity of network devices arranged at a marginal region of a network segment are each equipped with the N limiting units.

5. The communication network as claimed in claim 1, wherein the multiplicity of network devices comprise at least two network devices that are redundant with regard to a functionality of the at least two network devices, further wherein the subsets are in a form such that each of the subsets has at most one of the redundant network devices associated with it.

6. The communication network as claimed in claim 1, wherein the subsets are disjunct subsets.

7. The communication network as claimed in claim 1, wherein the plurality of N virtual networks are implemented in the communication network such that each of the network devices is coupled to the communication network via at least two virtual networks and no virtual network of the plurality of N virtual networks has a ring topology.

8. The communication network as claimed in claim 1, wherein the plurality of N virtual networks are implemented in the communication network such that a maximum link transmission rate is determined for each communication path between a transmission port and a reception port, wherein the sum of the N threshold values of the N limiting units is less than or equal to the maximum link transmission rate of the associated reception port.

9. The communication network as claimed in claim 1, wherein the data are associated with at least two priority classes, wherein the N limiting units are set up to limit exclusively the data reception of a higher priority class.

10. The communication network as claimed in claim 1, wherein the communication network is an Ethernet network.

11. The communication network as claimed in claim 1, wherein the multiplicity of network devices are each an individual FPGA, ASIC, IC chip or hardwired microcircuit.

12. The communication network as claimed in claim 1, wherein the communication network comprises the multiplicity of the network devices and a number of coupling switch devices, wherein the number of coupling switch devices are each coupled to the communication network exclusively via a single virtual network.

13. A method for forming a communication network having a multiplicity of network devices, comprising:
implementing a plurality N of virtual networks in the communication network such that each of the multiplicity of network devices is coupled to the communication network via at least two virtual networks; and
arranging the multiplicity of network devices in a plurality of network segments, wherein each of the plurality of network segments is allocated a subset of the multiplicity of network devices, wherein each network device arranged at a marginal region of a network segment is equipped with N limiting units, wherein a respective instance of the N limiting units is allocated to a respective instance of the N virtual networks and is set up to limit data reception of data associated with the respective virtual network to a threshold value for the data transmission rate, which threshold value is predetermined for the respective virtual network;
wherein the virtual networks are implemented in the communication network so as to prevent overshooting of the threshold value for the data transmission rate at a limiting unit of a network segment on account of reception of data from another network segment.

14. A computer program product that prompts the performance of a method as claimed in claim 13 on one or more program controlled devices.

* * * * *